(12) United States Patent
Ghatpande et al.

(10) Patent No.: US 12,407,626 B2
(45) Date of Patent: Sep. 2, 2025

(54) PRIORITY-BASED NETWORK BANDWIDTH ALLOCATION

(71) Applicant: VMware LLC, Palo Alto, CA (US)

(72) Inventors: Rushikesh Ghatpande, Sunnyvale, CA (US); Nilesh Ramchandra Nipane, Mountain View, CA (US); Lele Zhang, Beijing (CN); Shyam Sambasivan Ramachandran, Mountain View, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/132,436

(22) Filed: Apr. 10, 2023

(65) Prior Publication Data

US 2024/0236016 A1 Jul. 11, 2024

(30) Foreign Application Priority Data

Jan. 10, 2023 (WO) ................ PCT/CN2023/071597

(51) Int. Cl.
*G06F 15/173* (2006.01)
*H04L 41/40* (2022.01)
(Continued)

(52) U.S. Cl.
CPC ............ *H04L 47/821* (2013.01); *H04L 41/40* (2022.05); *H04L 47/76* (2013.01)

(58) Field of Classification Search
CPC ........ H04L 47/821; H04L 41/40; H04L 47/76
(Continued)

(56) References Cited

U.S. PATENT DOCUMENTS

| 6,304,552 B1 * | 10/2001 | Chapman | ................ H04L 47/10 |
| | | | 370/235 |
| 7,058,027 B1 * | 6/2006 | Alessi | ................... H04L 1/0068 |
| | | | 370/310.1 |

(Continued)

FOREIGN PATENT DOCUMENTS

| CN | 113098703 A * | 7/2021 | |
| EP | 3197110 A1 * | 7/2017 | ......... H04L 12/6418 |

*Primary Examiner* — Liang Che A Wang
(74) *Attorney, Agent, or Firm* — King Intellectual Asset Management

(57) ABSTRACT

Example methods and systems for priority-based network bandwidth allocation are described. In one example, a first computer system may detect an event indicating that network bandwidth allocation is required for a virtualized computing instance. The first computer system may identify, from multiple priority levels, a first priority level that is associated with (a) the virtualized computing instance, (b) a logical network element to which the virtualized computing instance is attached, or (c) a group that includes the virtualized computing instance or the logical network element. The first computer system may obtain network bandwidth capacity information associated with physical network adapter(s) capable of forwarding traffic associated with the virtualized computing instance. Based on the first priority level and the network bandwidth capacity information, the first computer system may configure a priority-based network bandwidth allocation policy that includes parameter(s) applicable to the traffic associated with the virtualized computing instance.

21 Claims, 9 Drawing Sheets

(51) Int. Cl.
*H04L 47/70* (2022.01)
*H04L 47/76* (2022.01)

(58) Field of Classification Search
USPC .......................................... 709/224, 226, 229
See application file for complete search history.

(56) References Cited

U.S. PATENT DOCUMENTS

| | | | | |
|---|---|---|---|---|
| 8,068,731 | B2* | 11/2011 | Peng | H04L 47/32 |
| | | | | 370/395.42 |
| 8,160,055 | B1* | 4/2012 | Nadeau | H04L 43/10 |
| | | | | 370/231 |
| 9,336,042 | B1* | 5/2016 | Brenneman | G06F 9/5088 |
| 11,601,434 | B1* | 3/2023 | Hornsby | H04L 63/0428 |
| 2016/0119299 | A1* | 4/2016 | Amulothu | H04L 63/20 |
| | | | | 380/255 |
| 2016/0203027 | A1* | 7/2016 | Challa | G06F 9/45558 |
| | | | | 718/1 |

* cited by examiner

```
{   "id" : "NRP1",     # NRP1=NRP-HIGH  ~ 511
    "priority": "P1", # P1=HIGH  ~ 512
    "resource_config" : {  ~ 513
        "pnic_reservation" : 60
        # percentage of pnic bandwidth reserved
        out of overall vm traffic reservation
        "shares" : 100,
        "limit" : -1 # no limit
    }
}
```
510 First network resource pool and priority level

```
{   "id" : "NPR2",     # NRP2=NRP-NORMAL  ~ 521
    "priority": "P2", # P2=NORMAL  ~ 522
    "resource_config" : {  ~ 523
        "pnic_reservation" : 30
        "shares" : 50,
        "limit" : -1 # no limit
    }
}
```
520 Second network resource pool and priority level

```
{   "id" : "NPR3",     # NRP3=NRP-LOW  ~ 531
    "priority": "P3", # P3=LOW  ~ 532
    "resource_config" : {  ~ 533
        "pnic_reservation" : 0 # no reservation
        "shares" : 25,
        "limit" : 20
        # traffic limit. percentage of pnic capacity
        on each host
    }
}
```
530 Third network resource pool and priority level

```
{   #STATIC BINDING
    "id": "849e339e...33068f70dc5a",
    "display_name": "LS1", #LS-HIGH-PRIORITY  ~ 541
    "resource_type": "LogicalSwitch",
    "transport_zone_id": "cfaec4c7...bd9976",
    "replication_mode": "MTEP",
    "admin_state": "UP",
    "vni": 11144,
    "switching_profile_ids": [...],
    "network_resource_pool": "NRP1"  ~ 542
}
```
540 Configuration information LS1→(NRP1,P1)

```
{   #DYNAMIC BINDING
    "resource_type": "NSGroup",
    "id": "71d33895...5cd6f478cf44",
    "display_name":"GROUP1",  ~ 551
    "members":[VM4,VM5]  ~ 552
    "network_resource_pool": "NRP1"  ~ 553
}
```
550 Configuration information GROUP1→(NRP1,P1)

Allocation for multiple ($K_i$) VMs sharing $NRP_i$

TABLE 7A

| $(NRP_i, P_i)$ | POLICY $(NRP_i, P_i)$ | POLICY$(NRP_i, P_i)$ T=10 Gbps | |
|---|---|---|---|
| $(NRP_1, P_1)$ HIGH | R1=60 S1=100 L1=-1 | R1'=((R1/100)*T)=6 S1'=(S1/(S1+S2+S3))*T=5.71 L1'=-1 | ← 711 |
| $(NRP_2, P_2)$ NORMAL | R2=30 S2=50 L2=-1 | R2'=((R2/100)*T)=3 S2'=(S2/(S1+S2+S3))*T=2.86 L2'=-1 | ← 712 |
| $(NRP_3, P_3)$ LOW | R3=0 S3=25 L3=20 | R3'=0 S3'=(S3/(S1+S2+S3))*T/K3=1.43 L3'=(L3/100)*T=2 | ← 713 |

720
EVENT = VM0 connecting to LS1 or joining host-A ⬇

TABLE 7B

| $(NRP_i, P_i)$ | POLICY $(NRP_i, P_i)$ | #VM $(NRP_i, P_i)$ | POLICY(VM), HOST-A T=10 Gbps | |
|---|---|---|---|---|
| $(NRP_1, P_1)$ HIGH | R1'=6 S1'=5.71 L1'=-1 | K1=3 (VM0, VM3, VM4) | R1(VM)=R1'/K1=6/3=2 Gbps S1(VM)=S1'/K1=5.71/3=1.90 Gbps L1(VM)=L1'=-1 | ← 721 |
| $(NRP_2, P_2)$ NORMAL | R2'=3 S2'=2.86 L2'=-1 | K2=4 (VM1, VM5, VM6, VM7) | R2(VM)=R1'/K2=3/4=0.75 Gbps S2(VM)=S2'/K2=2.86/4=0.71 Gbps L2(VM)=-1 | ← 722 |
| $(NRP_3, P_3)$ LOW | R3'=0 S3'=1.43 L3'=2 | K3=3 (VM2, VM8, VM9) | R3(VM)=0 S3(VM)=S3'/K3=1.43/3=0.48 Gbps L3(VM)=L3'/K3=2/3=0.67 Gbps | ← 723 |

Allocation per VM assigned to $(NRP_i, P_i)$

730
EVENT = VM3 and VM5 leaving host-A ⬇

TABLE 7C

| $(NRP_i, P_i)$ | POLICY $(NRP_i, P_i)$ | #VM $(NRP_i, P_i)$ | POLICY(VM), HOST-A | |
|---|---|---|---|---|
| $(NRP_1, P_1)$ HIGH | R1'=6 S1'=5.71 L1'=-1 | K1=3→2 (VM0, VM4) | R1(VM)=6/2=3 S1(VM)=5.71/2=2.86 L1(VM)=-1 | ← 731 |
| $(NRP_2, P_2)$ NORMAL | R2'=3 S2'=2.86 L2'=-1 | K2=4→3 (VM1, VM6, VM7) | R2(VM)=3/3=1 S2(VM)=2.86/3=0.95 L2(VM)=-1 | ← 732 |
| $(NRP_3, P_3)$ LOW | R3'=0 S3'=1.43 L3'=2 | K3=3 (VM2, VM8, VM9) | R3(VM)=0 S3(VM)=0.48 L3(VM)=0.67 | ← 733 |

Allocation per VM assigned to $(NRP_i, P_i)$

TABLE 7B

| (NRPi,Pi) | POLICY (NRPi,Pi) | #VM (NRPi,Pi) | POLICY(VM),HOST-A T=10 Gbps | |
|---|---|---|---|---|
| (NRP1,P1) HIGH | R1'=6 S1'=5.71 L1'=-1 | K1=3 (VM0,VM3, VM4) | R1(VM)=R1'/K1=6/3=2 Gbps S1(VM)=S1'/K1=5.71/3=1.90 Gbps L1(VM)=L1'=-1 | 721 |
| (NRP2,P2) NORMAL | R2'=3 S2'=2.86 L2'=-1 | K2=4 (VM1,VM5, VM6,VM7) | R2(VM)=R1'/K2=3/4=0.75 Gbps S2(VM)=S2'/K2=2.86/4=0.71 Gbps L2(VM)=-1 | 722 |
| (NRP3,P3) LOW | R3'=0 S3'=1.43 L3'=2 | K3=3 (VM2,VM8, VM9) | R3(VM)=0 S3(VM)=S3'/K3=1.43/3=0.48 Gbps L3(VM)=L3'/K3=2/3=0.67 Gbps | 723 |

810
EVENT = Reduced capacity (e.g., PNIC removal or link up→down)

TABLE 8A

| POLICY (NRPi,Pi) | POLICY(NRPi,Pi) T=10→T'=8 Gbps | #VM (NRPi,Pi) | POLICY(VM) | |
|---|---|---|---|---|
| R1=60% S1=100 L1=-1 | R1'=((R1/100)*T')=4.8 S1'=(S1/(S1+S2+S3))*T'=4.57 L1'=-1 | K1=3 (VM0,VM3, VM4) | R1(VM)=1.6 S1(VM)=1.52 L1(VM)=-1 | 811 |
| R2=30% S2=50 L2=-1 | R2'=((R2/100)*T')=2.4 S2'=(S2/(S1+S2+S3))*T'=2.29 L2'=-1 | K2=4 (VM1,VM5, VM6,VM7) | R2(VM)=0.6 S2(VM)=0.57 L2(VM)=-1 | 812 |
| R3=0 S3=25 L3=20% | R3'=0 S3'=(S3/(S1+S2+S3))*T'=1.14 L3'=(L3/100)*T'=2 | K3=3 (VM2,VM8, VM9) | R2(VM)=0 S3(VM)=0.38 L3(VM)=0.53 | 813 |

Allocation per VM

820
EVENT = Increased capacity (e.g., PNIC addition or link down→up)

TABLE 8B

| POLICY (NRPi,Pi) | POLICY(NRPi,Pi) T=10→T'=12 Gbps | #VM (NRPi,Pi) | POLICY(VM) | |
|---|---|---|---|---|
| R1=60% S1=100 L1=-1 | R1'=((R1/100)*T')=7.2 S1'=(S1/(S1+S2+S3))*T'=6.86 L1'=-1 | K1=3 (VM0,VM3, VM4) | R1(VM)=2.4 S1(VM)=2.29 L1(VM)=-1 | 821 |
| R2=30% S2=50 L2=-1 | R2'=((R2/100)*T')=3.6 S2'=(S2/(S1+S2+S3))*T'=3.43 L2'=-1 | K2=4 (VM1,VM5, VM6,VM7) | R2(VM)=0.9 S2(VM)=0.86 L2(VM)=-1 | 822 |
| R3=0 S3=25 L3=20% | R3'=0 S3'=(S3/(S1+S2+S3))*T'=1.71 L3'=(L3/100)*T'=2.4 | K3=3 (VM2,VM8, VM9) | R2(VM)=0 S3(VM)=0.57 L3(VM)=0.8 | 823 |

Allocation per VM

TABLE 9A: ADAPTIVE NETWORK RESOURCE POOL

| % of VMs assigned with (NRP1, P1) | Pool size of NRP1 | |
|---|---|---|
| < 25 | R1 = 40% of T reserved for VM traffic | 920 |
| 25-50 | R1 = 60% of T reserved for VM traffic | 910 |
| > 50 | R1 = 75% of T reserved for VM traffic | 930 |

TABLE 9B: ADAPTIVE RATE LIMITATION

| % of VMs assigned with (NRP3, P3) | Maximum allowed speed | |
|---|---|---|
| < 25 | 10 Mbps | 950 |
| 25-50 | 5 Mbps | 940 |
| > 50 | 2 Mbps | 960 |

Fig. 9

PRIORITY-BASED NETWORK BANDWIDTH ALLOCATION

CROSS REFERENCE TO RELATED APPLICATION

The present application claims the benefit of Patent Cooperation Treaty (PCT) Application No. PCT/CN2023/071597, filed Jan. 10, 2023, which is incorporated herein by reference.

BACKGROUND

Virtualization allows the abstraction and pooling of hardware resources to support virtual machines in a software-defined data center (SDDC). For example, through server virtualization, virtualized computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, various VMs deployed on different logical networks may have different network bandwidth requirements. During periods of resource contention, it is undesirable to starve some VMs of network bandwidth while others over-utilize their allocation.

BRIEF DESCRIPTION OF DRAWINGS

FIG. 5 is a schematic diagram illustrating example configuration information to facilitate priority-based network bandwidth allocation;

FIG. 7 is a schematic diagram illustrating first example configurations of priority-based network bandwidth allocation policies;

FIG. 8 is a schematic diagram illustrating second example configurations of priority-based network bandwidth allocation policies; and FIG. 9 is a schematic diagram illustrating examples of adaptive network resource pool and adaptive rate limitation.

DETAILED DESCRIPTION

According to examples of the present disclosure, network bandwidth allocation may be implemented in an improved manner using a priority-based approach. Using examples of the present disclosure, a more granular control on network bandwidth allocation may be implemented using priority levels and priority-based network bandwidth allocation policies. In one example, a first computer system (e.g., management entity 190 in FIGS. 1-2) may detect an event indicating that network bandwidth allocation is required for a virtualized computing instance (e.g., VM0 130 in FIGS. 1-2) supported by the first computer system or a second computer system (e.g., host-A 110A in FIGS. 1-2).

Figure 2:
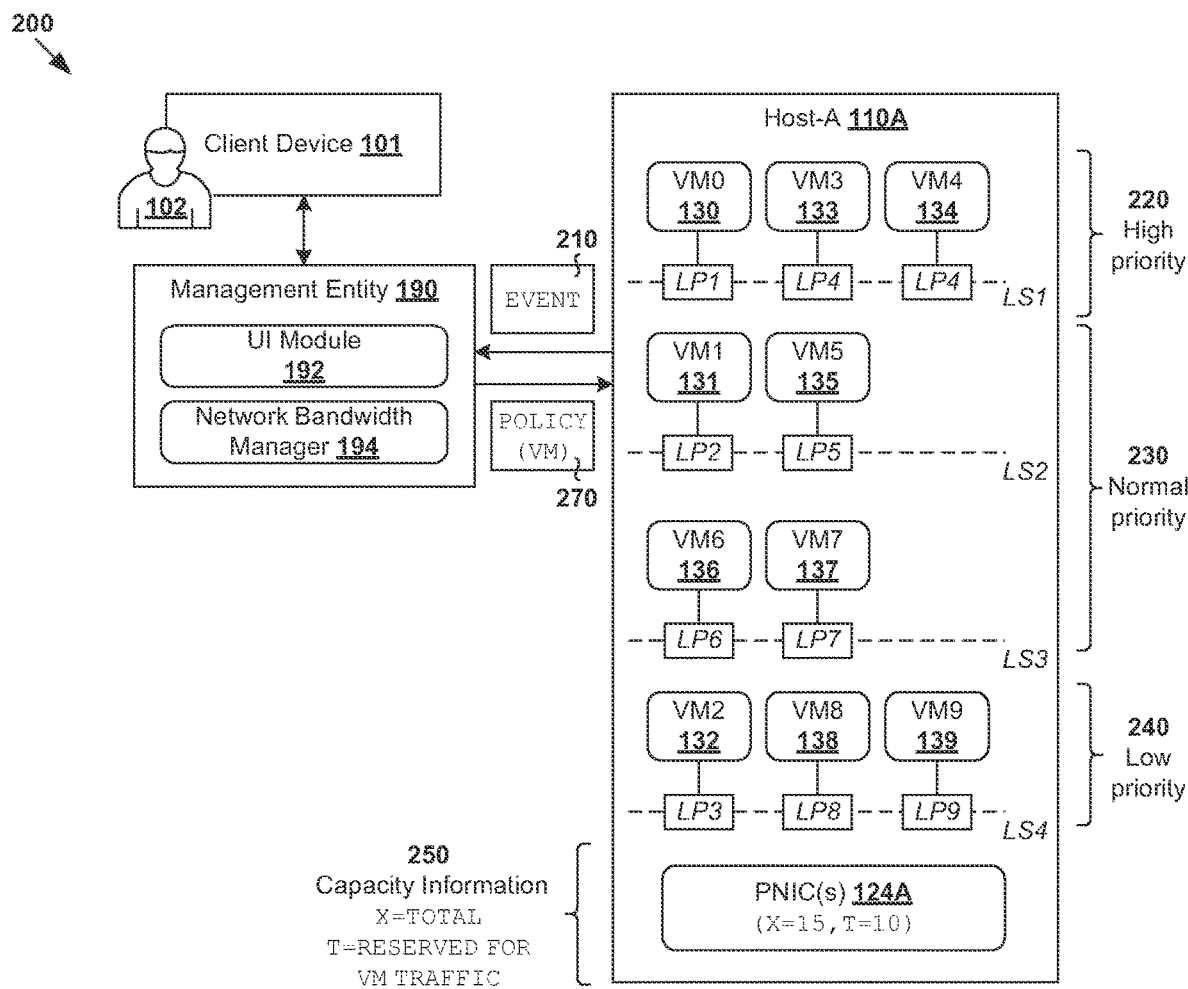
FIG. 2 is a schematic diagram illustrating an example of priority-based network bandwidth allocation.

The first computer system may identify, from multiple priority levels, a first priority level that is associated with (a) the virtualized computing instance, (b) a logical network element to which the virtualized computing instance is attached, or (c) a group that includes the virtualized computing instance or the logical network element (see examples in FIGS. 2 and 5). The multiple priority levels may include the first priority level (e.g., P1 in FIG. 2) and at least a second priority level (e.g., P2 and P3 in FIG. 2). The first computer system may obtain network bandwidth capacity information associated with physical network adapter(s) that are capable of forwarding traffic associated with the virtualized computing instance. Based on the first priority level and the network bandwidth capacity information, the first computer system may configure a priority-based network bandwidth allocation policy that includes parameter(s) that are applicable to the traffic associated with the virtualized computing instance.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
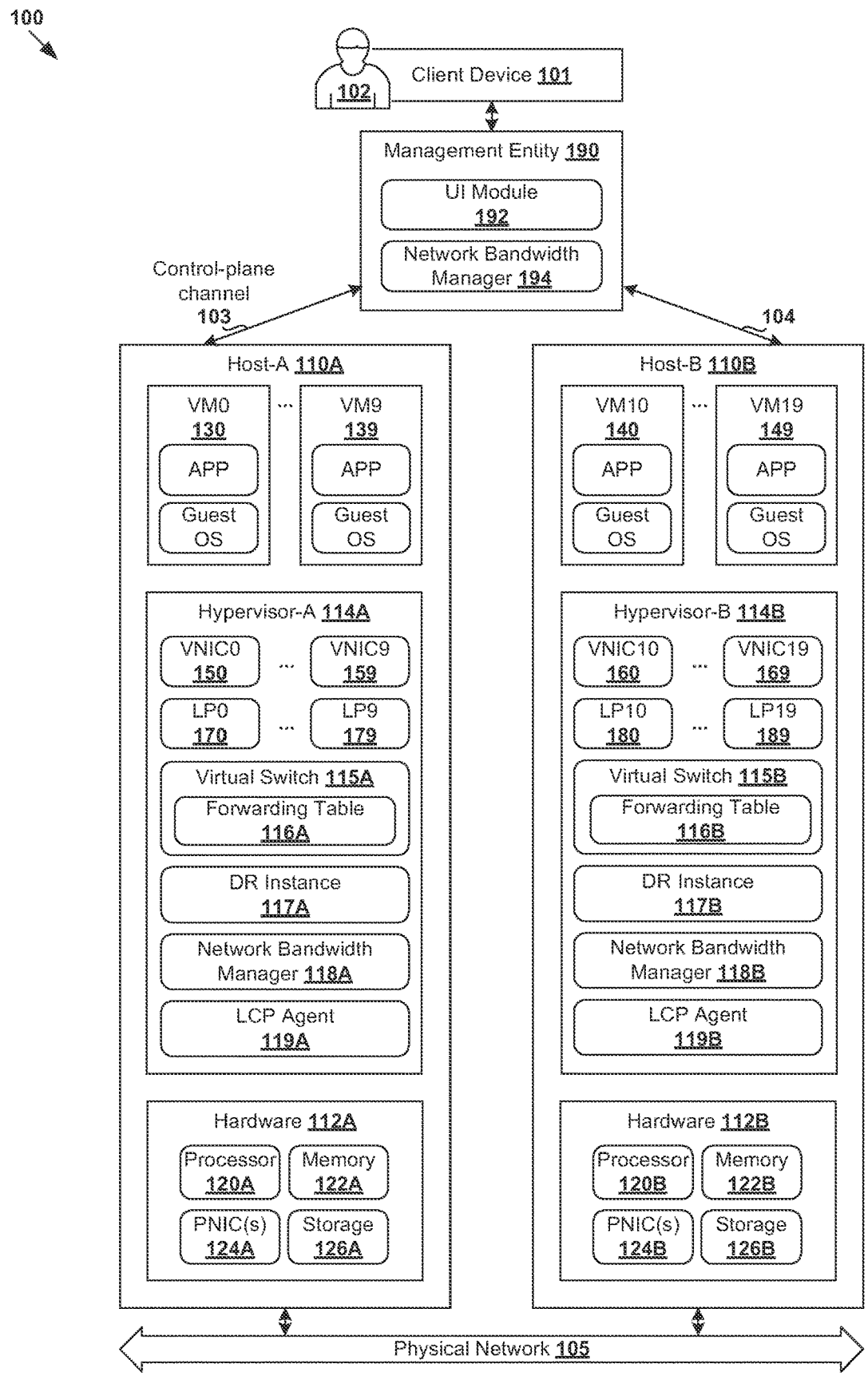
FIG. 1 is a schematic diagram illustrating an example software-defined networking (SDN) environment in which priority-based network bandwidth allocation may be implemented.

FIG. 1 is a schematic diagram illustrating example software-defined networking (SDN) environment 100 in which priority-based network bandwidth allocation may be performed. It should be understood that, depending on the desired implementation, SDN environment 100 may include additional and/or alternative components than that shown in FIG. 1. In practice, SDN environment 100 may include any suitable number of hosts (also known as "computer systems," "computing devices", "host computers", "host devices", "physical servers", "server systems", "transport nodes," etc.).

In the example in FIG. 1, SDN environment 100 may include host-A 110A and host 110B (two shown for simplicity). Host 110A/110B may include suitable hardware 112A/112B and virtualization software (e.g., hypervisor-A 114A, hypervisor-B 114B) to support various VMs. For example, host-A 110A may support VMs 130-139 (see "VM0" to "VM9"), while host-B 110B may support VMs 140-149 (see "VM10" to "VM19"). Hardware 112A/112B includes suitable physical components, such as central processing unit(s) (CPU(s)) or processor(s) 120A/120B; memory 122A/122B; physical network adapters or physical network interface controllers (PNICs) 124A/124B; and storage disk(s) 126A/126B, etc.

Hypervisor 114A/114B maintains a mapping between underlying hardware 112A/112B and virtual resources allocated to respective VMs. Virtual resources are allocated to respective VMs 130-149 to each support a guest operating system (OS) and application(s). For example, the virtual resources may include virtual CPU, guest physical memory, virtual disk, virtual network interface controller (VNIC), etc. Hardware resources may be emulated using virtual machine monitors (VMMs). For example in FIG. 1, VNICs 150-169 are virtual network adapters for VMs 130-149, respectively, and are emulated by corresponding VMMs (not shown) instantiated by their respective hypervisor at respective host-A 110A and host-B 110B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-1" may refer generally to a link layer or media access control (MAC) layer; "layer-3" a network or Internet Protocol (IP) layer; and "layer-4" a transport layer (e.g., using Transmission Control Protocol (TCP), User Datagram Protocol (UDP), etc.), in the Open System Interconnection (OSI) model, although the concepts described herein may be used with other networking models.

Management entity 190 may be a computer system capable of performing management functionalities, such as an SDN manager, SDN controller or a combination of both. One example of an SDN controller is the NSX controller component of VMware NSX® (available from VMware, Inc.) that operates on a central control plane. The SDN controller may be a member of a controller cluster (not shown for simplicity) that is configurable using the SDN manager. Management entity 190 may be implemented using physical machine(s), VM(s), or both. To send or receive control information, a local control plane (LCP) agent 119A/119B on host 110A/110B may interact with management entity 190 via control-plane channel 103/104.

Through virtualization of networking services in SDN environment 100, logical networks (also referred to as logical overlay networks) may be provisioned, changed, stored, deleted, and restored programmatically without having to reconfigure the underlying physical hardware architecture. Hypervisor 114A/114B implements virtual switch 115A/115B and logical distributed router (DR) instance 117A/117B to handle egress packets from, and ingress packets to, VMs 130-149. In SDN environment 100, logical switches and logical DRs may be implemented in a distributed manner and can span multiple hosts.

For example, a logical switch (LS) may be deployed to provide logical layer-2 connectivity to VMs 130-149. A logical switch may be implemented collectively by virtual switches 115A-B and represented internally using forwarding tables 116A-B at respective virtual switches 115A-B. Forwarding tables 116A-B may each include entries that collectively implement the respective logical switches. Further, logical DRs that provide logical layer-3 connectivity may be implemented collectively by DR instances 117A-B and represented internally using routing tables (not shown) at respective DR instances 117A-B. Each routing table may include entries that collectively implement the respective logical DRs. Example logical switches will be described using FIG. 6.

Packets may be received from, or sent to, each VM via an associated logical switch port. For example, logical switch ports 170-189 (see "LP1" to "LP9" on host-A 110A and "LP10" to "LP19" on host-B 110B) are associated with respective VMs 130-149. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-B, whereas a "virtual switch" may refer generally to a software switch or software implementation of a physical switch. In practice, there is usually a one-to-one mapping between a logical port on a logical switch and a virtual port on virtual switch 115A/115B.

A logical overlay network may be formed using any suitable tunneling protocol, such as Virtual extensible Local Area Network (VXLAN), Stateless Transport Tunneling (STT), Generic Network Virtualization Encapsulation (GENEVE), Generic Routing Encapsulation (GRE), etc. For example, VXLAN is a layer-2 overlay scheme on a layer-3 network that uses tunnel encapsulation to extend layer-2 segments across multiple hosts which may reside on different physical networks. Hypervisor 114A/114B may implement virtual tunnel endpoint (VTEP) (not shown for simplicity) to encapsulate and decapsulate packets with an outer header (also known as a tunnel header) identifying the relevant logical overlay network (e.g., VNI). Hosts 110A-B may maintain data-plane connectivity with each other via physical network 105 to facilitate east-west communication among VMs 130-149.

Network Input/Output (I/O) Control

In practice, different types of traffic may have different network bandwidth requirements, such as system traffic to facilitate system-related functionalities and VM traffic to facilitate VM operations. System traffic may further include management traffic to/from management entity 190, VM migration traffic from one host to another, fault tolerance traffic, virtual storage area network (VSAN) traffic, Internet small computer system interface (iSCSI) traffic, network file system (NFS) traffic, data replication traffic, data protection backup traffic, backup network file copy (NFC) traffic, non-volatile memory express (NVMe) over TCP traffic, etc.

One approach for partitioning physical network bandwidth among different traffic types is through network input/output control (NIOC) configuration supported by management entity 190. For example, a user may reserve 66.67% (i.e., ⅔) of the total PNIC capacity for VM traffic, and the rest (i.e., 33.33% or ⅓) for system traffic. For host-A 110A with a total PNIC capacity of 15 Gigabit per second (Gbps), 66.67% or 10 Gbps may be reserved for VM traffic associated with VMs 130-139. In the following, X denotes the total network bandwidth capacity provided by physical network adapter(s) on each host 110A/110B, and T≤X denotes the reserved amount for VM traffic, such as X=15 and T=10.

Conventionally, VMs on a particular host are generally allocated with an equal share of the available network bandwidth. One example is shown in FIG. 2, which is a schematic diagram illustrating example 200 of priority-based network bandwidth allocation. In this case, since host-A 110A supports K=10 VMs 130-139 (see "VM0" to "VM9"), each VM may be allocated with an equal share of the T=10 Gbps reserved for VM traffic. See example conventional allocation at 205 in FIG. 2 (parameters R, S and L in FIG. 2 will be discussed below).

Conventional approach 205 in FIG. 2 may be inadequate in cases where VMs having different network bandwidth requirements are deployed in SDN environment 100. In this case, another conventional approach is to configure a separate policy for each VM manually. However, this is a cumbersome task that needs to be performed on a "per VM" basis. For example, it is necessary for user 102 (e.g., network administrator) operating client device 101 to interact with management entity 190 to configure specific network bandwidth allocation parameter(s) for each VM repeatedly. Besides time-consuming and inefficient, such conventional approach also lacks scalability, especially when there are hundreds or thousands of VMs.

Priority-Based Network Bandwidth Allocation

According to examples of the present disclosure, network bandwidth allocation may be improved using a priority-based approach. Using examples of the present disclosure, a more granular control on network bandwidth allocation may be implemented using priority levels and priority-based network bandwidth allocation policies. Examples of the present disclosure may be implemented to simplify a network administrator's work by reducing the need for manual policy configuration on a "per VM" basis. This way, service level agreements (SLAs) for different types of networks may be managed more effectively, particularly to improve the quality of service (QOS) for high-priority workloads.

Some examples will be described below using FIG. 2 and FIG. 3, which is a flowchart of example process 300 for a computer system to perform priority-based network bandwidth allocation. Example process 300 may include one or more operations, functions, or actions illustrated by one or more blocks, such as 310 to 340. The various blocks may be combined into fewer blocks, divided into additional blocks, and/or eliminated depending on the desired implementation. In the following, various examples will be discussed using management entity 190 as an example "first computer system," host 110A/110B as "second computer system" and VMs 130-149 as example "virtualized computing instances," etc.

To implement priority-based network bandwidth allocation, management entity 190 may support any suitable software and/or hardware component(s), such as user interface (UI) module 192, network bandwidth manager 194 (e.g., NIOC module), etc. Similarly, host 110A/110B may support any suitable software and/or hardware component(s), such as network bandwidth manager 218A/218B supported by hypervisor 214A/214B. Throughout the present disclosure, a "first computer system" in the form of management entity 190 may configure priority-based network bandwidth allocation policies for VMs that are supported by host 110A/110B in SDN environment 100. In an alternative scenario, the "first computer system" (e.g., host) may configure priority-based network bandwidth allocation policies for VMs that are supported by the first computer system itself.

Figure 3:
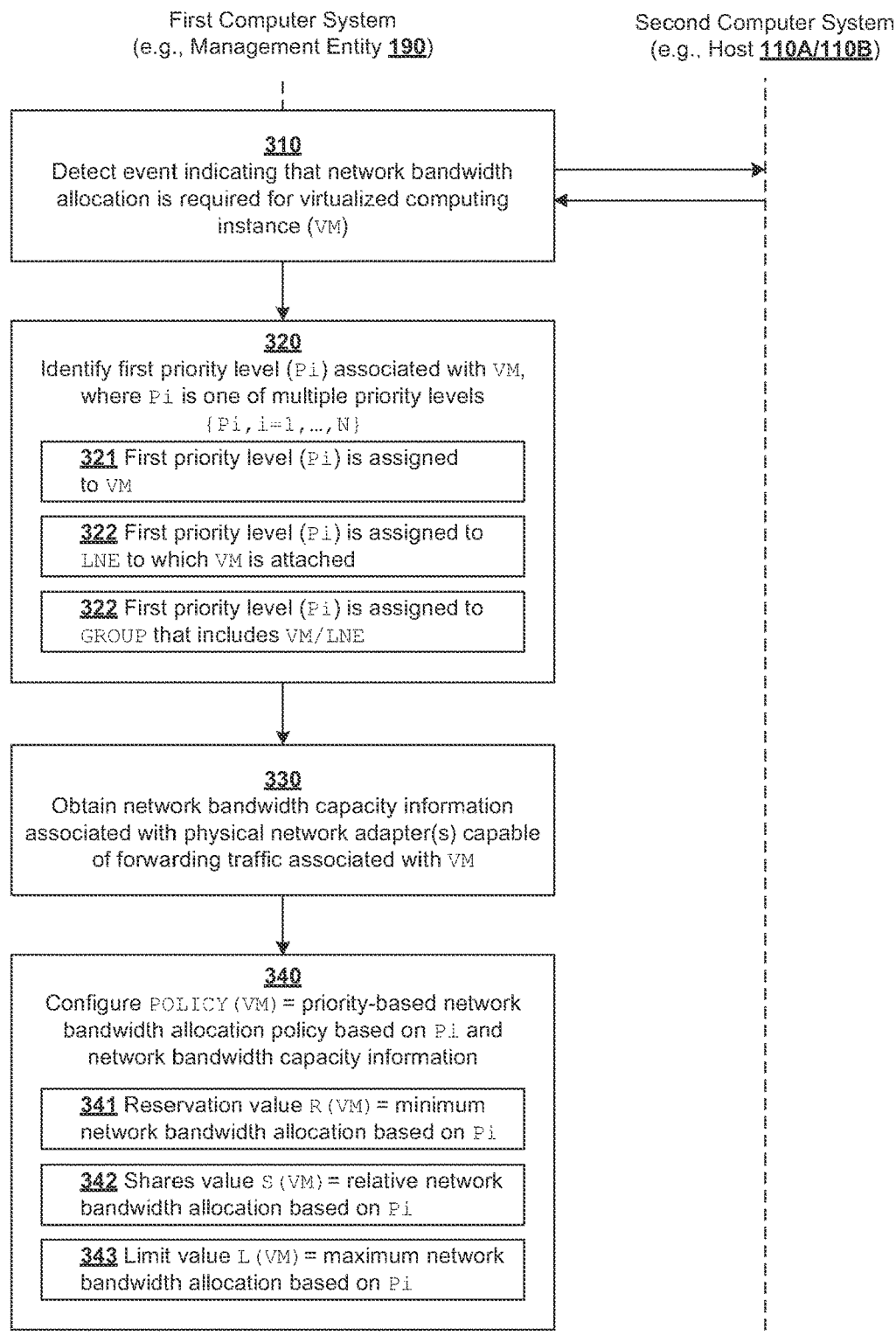
FIG. 3 is a flowchart of an example process for a first computer system to perform priority-based network bandwidth allocation.

At 310 in FIG. 3, management entity 190 may detect an event indicating that network bandwidth allocation is required for VM(s), such as one or more of VMs 130-139 supported by host-A 110A. For example in FIG. 2, the event may be detected based on report information from host-A 110A (see 210). Depending on the desired implementation, block 310 may involve detecting one of the following events: VM(s) connecting to a logical switch, VM(s) joining or leaving host-A 110A, addition or removal of physical network adapter(s), and PNIC link provided by physical network adapter(s) going up or down.

At 320 in FIG. 3, management entity 190 may identify, from multiple priority levels, a first priority level that is associated with (a) the VM, (b) a logical network element (e.g., logical switch, logical port, logical router) to which the VM is attached, or (c) a group that includes the VM or the logical network element. For example in FIG. 2, consider a scenario with N=3 priority levels denoted as P1 (e.g., high priority for mission-critical workloads), P2 (e.g., normal or default priority) and P3 (e.g., low priority for steal-cycle workloads). See 321-323 in FIG. 3.

Depending on the desired implementation, a dedicated network resource pool (denoted as NRPi) may be configured for each priority level, such as NRP1 for P1, NRP2 for P2 and NRP3 for P3. In a first example, block 320 may involve identifying that (NRP1, P1) is associated with (a) VM0 130, (b) a logical network element in the form of logical switch=LS1 to which VM0 130 is attached, or (c) a group that includes VM0 130 or logical switch=LS1. In a second example, (NRP2, P2) is associated with (a) VM1 131, (b) logical switch=LS2 to which VM1 131 is attached, or (c) a group that includes VM1 131 or logical switch=LS2. In a third example, (NRP3, P3) is associated with (a) VM2 132, (b) logical switch=LS4 to which VM2 132 is attached, or (c) a group that includes VM2 132 or logical switch=LS4. See also 220-240 in FIG. 2.

At 330 in FIG. 3, management entity 190 may obtain network bandwidth capacity information associated with physical network adapter(s) that are capable of forwarding traffic associated with the VM(s). For example in FIG. 2, the network bandwidth capacity information associated with PNIC(s) 124A may specify X=total PNIC capacity (e.g., 15 Gbps) and T=reserved amount for VM traffic on host-A 110A. See also 250 in FIG. 2.

At 340 in FIG. 3, based on the first priority level and the network bandwidth capacity information, management entity 190 may configure a priority-based network bandwidth allocation policy that includes parameter(s) applicable to the traffic associated with the VM. Here, the term "priority-based network bandwidth allocation policy" may refer generally to parameter(s) configured based on a priority level associated with a network bandwidth consumer. For each priority level=Pi where i∈{1, 2, 3}, example parameters may include (a) Ri(VM)=reservation value specifying a minimum network bandwidth allocation, (b) Si(VM)= shares value specifying a relative network bandwidth allocation, and (c) Li(VM)=limit value specifying a maximum network bandwidth allocation. See 341-343 in FIG. 3.

As used herein, the term "reservation" or "reservation value" is used to generally describe a guaranteed minimum network bandwidth allocation. Reservation may be expressed as a percentage of the overall capacity of PNIC 124A/124B. In practice, reservation is useful for timesensitive traffic flow (e.g., voice, video, etc.) that requires a minimum data transfer rate. The term "shares" or "shares value" is used generally to describe the relative importance of a traffic flow compared to at least one other traffic flow. The shares value may be applied when physical network adapter(s) are saturated. Shares may be specified in absolute units with a value ranging from 1 to 100 to provide a greater flexibility for unused network bandwidth redistribution. For example, a first consumer with shares=100 is given a larger share of unused network bandwidth than a second consumer with shares=50. The term "limit" or "limit value" is used to generally describe a maximum network bandwidth allocation (e.g., maximum permitted data transfer rate). Similar to reservation, limit may be expressed as a percentage of the overall capacity of PNIC 124A/124B.

Some example policies are shown at 260-263 in FIG. 2. At 261, first priority-based policy=(R1(VM), S1(VM), L1(VM)) associated with first priority level=P1 may be applicable to traffic to/from VM0 130. At 262, second priority-based policy=(R2(VM), S2(VM), L2(VM)) associated with second priority level=P2 (normal priority) may be applicable to traffic to/from VM1 131. At 262, third priority-based policy=(R3(VM), S3(VM), L3(VM)) associated with third priority level=P3 (low priority) may be applicable to traffic to/from VM2 132. At 270, management 190 may instruct host-A 110A (e.g., network bandwidth manager 118A) to apply policies 261-263.

In practice, priority-based network bandwidth allocation policies may be configured to prioritize allocation for high-priority workloads compared to other workloads. For example, R1(VM)>R2(VM)>R3(VM) is to guarantee more network bandwidth for high-priority workloads. Similarly, S1(VM)>S2(VM)>S3(VM) is to indicate that high-priority workloads are the most important and low-priority workloads the least important during periods of resource contention. Also, L3(VM)<L1(VM), L2(VM) is to impose a stricter rate limitation on low-priority workloads. Various example policies will be discussed in more detail using FIGS. 4-9 below.

Priority-Based Configurations

Figure 4:
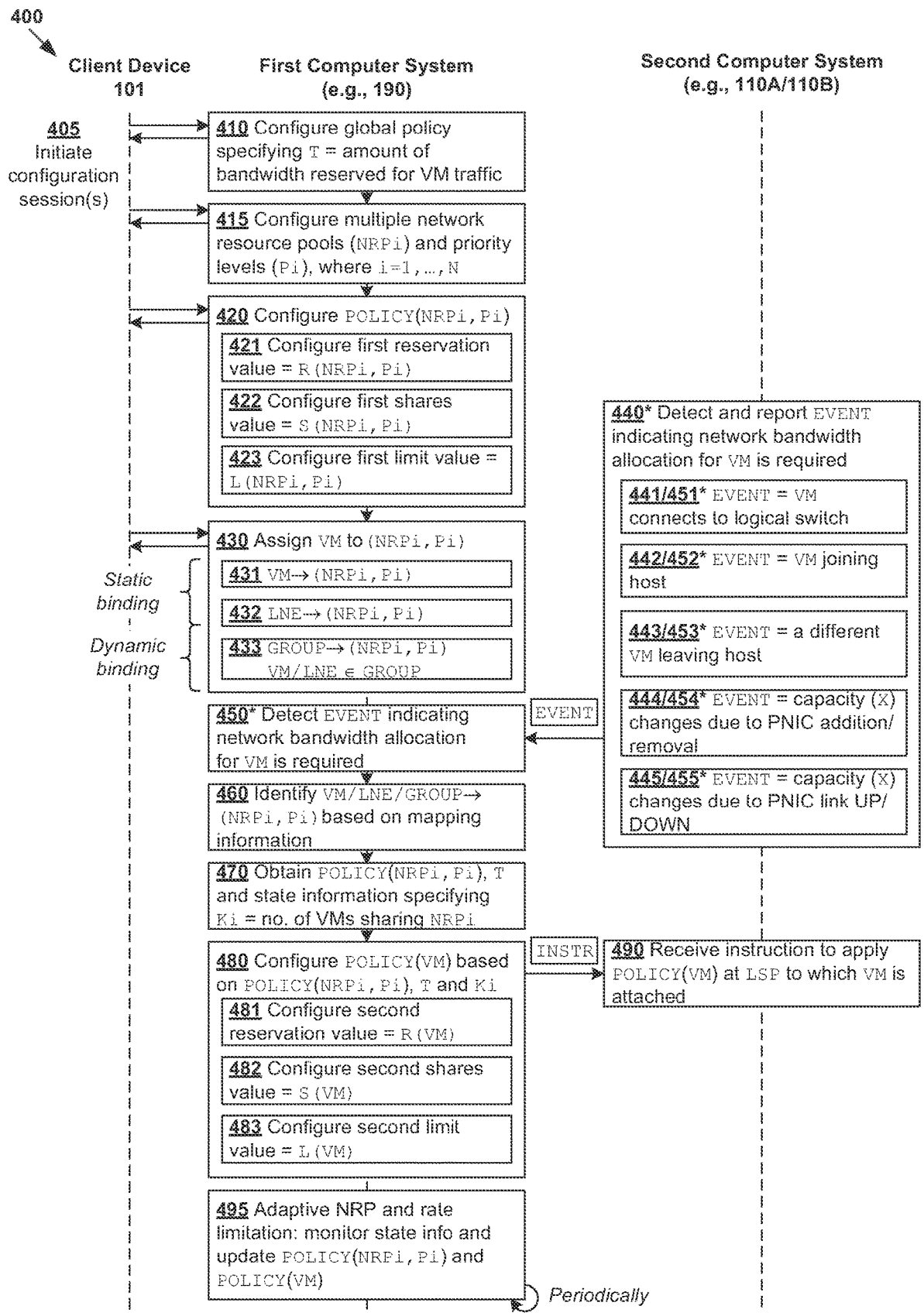
FIG. 4 is a flowchart of an example detailed process for priority-based network bandwidth allocation.

FIG. 4 is a flowchart of example detailed process 400 for a computer system to perform priority-based network bandwidth allocation. Example process 400 may include one or more operations, functions, or actions illustrated at 405 to 495. The various operations, functions or actions may be combined into fewer blocks, divided into additional blocks, and/or eliminated depending on the desired implementation. The example in FIG. 4 will be discussed using FIG. 5, which is a schematic diagram illustrating example configuration information 500 to facilitate priority-based network bandwidth allocation. Although explained using host-A 110A, examples of the present disclosure may be implemented to configure priority-based policies for VMs 140-149 supported by host 110B, etc.

In the following, various configurations in blocks 410-430 in FIG. 4 may be initiated by management entity 190 (e.g., default settings) and/or a user (e.g., network administrator) by interacting with management entity 190 via physical network 105. In the latter case, a particular configuration may be initiated using any suitable interface supported by user interface (UI) module 192 on management entity 190, such as graphical user interface (GUI) command-line interface (CLI), application programming interface (API) calls, or any combination thereof. For example in FIG. 4 (see 405), a user may interact with management entity 190 to configure bandwidth reservation for different traffic types, network resource pools, priority levels, network bandwidth allocation policies, priority level assignment, etc.

(a) Bandwidth Reservation for Different Traffic Types

At 410 in FIG. 4, management entity 190 may configure a global NIOC policy specifying the amount of network bandwidth that is reserved for different traffic types on host 110A/110B. For example, consider a scenario where the total network bandwidth capacity provided by PNIC 124A/124B is X=15 Gbps on host 110A/110B. In this case, the global policy may reserve T=10 Gbps for VM traffic. The remaining amount (i.e., X−T=5 Gbps) may be reserved for system traffic, such as management traffic, fault tolerance traffic, VSAN traffic, iSCSI traffic, NFS traffic, data replication traffic, data protection backup traffic, backup NFC traffic, NVMe over TCP traffic, etc. In practice, (X, T) may be the same or different on different hosts.

(b) Network Resource Pools and Priority Levels for VM Traffic

At 415 in FIG. 4, management entity 190 may configure multiple (N) priority levels and associated network resource pools. In the following, a particular network resource pool may be denoted as NRPi, and a particular priority level as Pi, where i∈{1, ..., N}. As used herein, the term "network resource pool" (NRPi) configured for a priority level (Pi) may refer generally to a portion of network bandwidth that is reserved for VMs associated with the priority level. The set of {NRPi, i=1, ..., N} may be configured based on T=10 Gbps reserved for VM traffic.

Some examples for the case of N=3 are shown in FIG. 5. At 510, management entity 190 may configure a first network resource pool that is assigned with ID=NRP1 and priority level=P1 (i.e., high priority). At 520, management entity 190 may configure a second network resource pool that is assigned with ID=NRP2 and priority level=P2 (i.e., default or normal priority). At 530, management entity 190 may configure a third network resource pool that is assigned with ID=NRP3 and priority level=P3 (i.e., low priority). See "id" and "priority" fields at 511-512 for (NRP1, P1), 521-522 for (NRP2, P2) and 531-532 for (NRP3, P3) in FIG. 5.

At 420 in FIG. 4, management entity 190 may configure a network bandwidth allocation policy that includes parameter(s) associated with each (NRPi, Pi). In the example in FIG. 5 (see "resource_config" field), each policy may specify the following parameters: (a) reservation value (see "pnic_reservation" field) specifying a minimum (guaranteed) network bandwidth allocation, (b) shares value (see "shares" field) specifying a relative amount of network bandwidth allocation and (c) limit (see "limit" field) value specifying a maximum network bandwidth allocation. Reservation, shares, and limit values configured for a particular (NRPi, Pi) will be denoted as (Ri, Si, Li) respectively.

In a first example (see 513 in FIG. 5), management entity 190 may configure (R1=60, S2=100, L1=−1) for (NRP1, P1). Here, reservation value R1=60 is to guarantee a minimum of 60% of T=10 Gbps reserved for VM traffic. Shares values S1>S2>S3 indicate the relative importance of the priority levels, where S1=100 indicates that P1 (i.e., high priority) is more important than $2=50 for P2 (i.e., normal priority) and S3=25 for P3 (i.e., low priority). Limit value L1=−1 is to configure unlimited network bandwidth allocation for (NRP1, P1).

In a second example (see 523 in FIG. 5), management entity 190 may configure (R2=30, S2=50, L2=−1) for (NRP2, P2). Here, reservation R2=30 is to guarantee a minimum of 30% of T=10 Gbps. Shares S2=50 indicates that P2 (i.e., normal priority) is less important than S1=100 for P1 (i.e., high priority) but more important than S3=25 for P3 (i.e., low priority). Limit L3=−1 is to configure unlimited network bandwidth allocation for (NRP2, P2).

In a third example (see 533 in FIG. 5), management entity 190 may configure a low-priority bandwidth allocation policy specifying R3=0, S3=25, L3=20 for (NRP3, P3). Here, reservation R3=0 provides no guarantee of network bandwidth. Shares S3=25 indicates that P3 (i.e., low priority) is the least important compared to S1=100 for P1 (i.e., high priority) and S2=50 for P2 (i.e., normal priority). Limit L3=20 is to configure a limit of 20% of T=10 Gbps, which is reserved for VM traffic on host-A 110A.

Network Resource Pool and Priority Level Assignment

At 425 in FIG. 4, once various network resource pools, priority levels and policies are configured, management entity 190 may assign VM(s) and/or logical network element(s) to particular (NRPi, Pi). According to a static binding approach, (NRPi, Pi) may be assigned to an individual VM or logical network element. According to a dynamic binding approach, (NRPi, Pi) may be assigned to a group that includes multiple members. A group member may be a VM or logical network element (e.g., logical switch, logical switch port or a logical router). See 431-433 in FIG. 4.

Several examples are shown in FIG. 5. At 540 in FIG. 5, using a static binding approach, logical switch=LS1 may be assigned to NRP1 associated with P1. In a first example (see 541-542), a "network resource pool" field may be configured. In a second example, a particular logical network element (e.g., LS1) or VM (e.g., VM0 130) may be tagged with a network resource pool (e.g., TAG="NRPi") and/or priority level (e.g., TAG="Pi"). One example implementation may involve using TAG=NRP1 or P1 for high priority and TAG=NRP3 or P3 for low priority. This way, any other VM(s) or logical network element(s) that are not tagged will be considered normal or default priority.

At 550 in FIG. 5, using a dynamic binding approach, GROUP1 may be assigned to (NRP1, P1). Since GROUP1 includes members=(VM4, VM5), this has the effect of assigning its members to (NRP1, P1). Depending on the desired implementation, a particular VM or logical network element may be tagged (e.g., TAG="GROUP1") to configure its group membership. See also 551-553 in FIG. 5.

Using the dynamic binding approach, the assignment of a VM or logical network element to particular (NRPi, Pi) may be updated by adding or removing a member from a group. In practice, configuration information 540/550 in FIG. 5 may include any suitable parameter(s) associated with a particular VM, logical network element or group, such as ID, display name, resource type (e.g., VM, logical switch, logical switch port, group), transport zone ID, replication mode, administration state, VNI, switching profile, member(s) of a group (where applicable), etc.

The static and dynamic binding approaches may be used to assign various VMs and/or logical network elements to one of {(NRPi, Pi), i=1, . . . , N}. Some examples will be described using FIG. 6, which is a schematic diagram illustrating examples 600 of network resource pool and priority level assignment. In this example (see also FIG. 2), host-A 110A may support one set of VMs 130-139, while host-B 110B may support another set of VMs 140-149. These VMs are deployed on various logical networks with respective logical switches denoted as LS1 601, LS2 602, LS3 603 and LS4 604. Two example scenarios are described below.

(a) First Example Scenario (See 610-630)

A first scenario where VM(s), logical network element(s) and group(s) are assigned to different priority levels will be described using 610-630 in FIG. 6. Here, at 610, management entity 190 may assign VM0 130 on host-A 110A, GROUP1 and VMs 140-142 on host-B 110B to (NRP1, P1). Since GROUP1 includes members=VM3 133 and VM4 134 on host-A 110A, this has the effect of assigning these VMs to (NRP1, P1).

Figure 6:
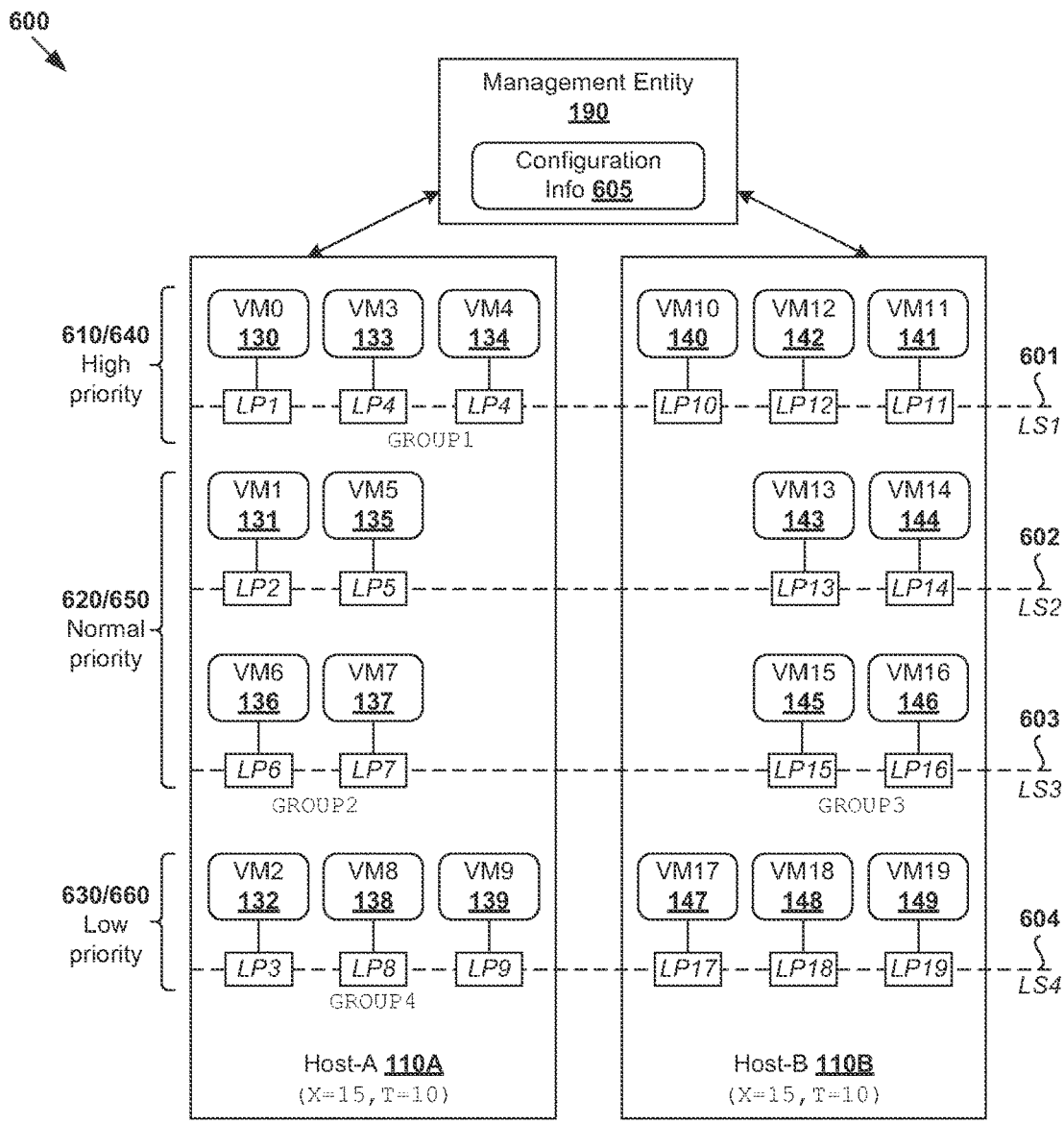
FIG. 6 is a schematic diagram illustrating an example of network resource pool and priority level assignment.

At 620 in FIG. 6, management entity 190 may assign logical switch=LS2 602, GROUP2 and GROUP3 to (NRP2, P2). Since VM1 131, VM5 135, VM13 143 and VM14 144 are connected to LS2 602, this has the effect of assigning these VMs to (NRP2, P2). Similarly, members [VM6, VM7] of GROUP2 and [VM15, VM16] of GROUP3 are also assigned to (NRP2, P2).

At 630 in FIG. 6, management entity 190 may assign members=[VM2, VM8, VM9] of GROUP4, as well as individual [VM17, VM18, VM19] on host-B 110B to (NRP2, P2). Configuration information (see 605) specifying the above associations may be generated and stored in any datastore accessible by management entity 190.

(b) Second Example Scenario (See 640-660)

A second scenario where logical switches 601-604 (and associated logical networks) are assigned to different priority levels will be described using 640-660 in FIG. 6. Here, management entity 190 may assign LS1 601 to (NRP1, P1), GROUP5 to (NRP2, P2) and LS4 604 to (NRP3, P3). This has the effect of assigning a first set of VMs connected to LS1 601 to (NRP1, P1), a second set of VMs connected to [LS2, LS3] of GROUP5 to (NRP2, P2), and a third set of VMs connected to LS4 604 to (NRP3, P3).

Event Detection

At 440-450 in FIG. 4, management entity 190 may detect an event indicating that network bandwidth allocation is required for VM(s) supported by host 110A/110B, such as based on report information from host 110A/110B. For example, network bandwidth allocation may be required when the number of consumers (e.g., VMs) sharing a particular network resource pool on a host changes. In another example, network bandwidth allocation may be required when PNIC capacity changes, which affects the amount of network bandwidth available.

Some scenarios are shown in FIG. 4. At 441/451, a first event may be associated with the VM connecting to a logical switch, such as VM0 130 connecting to LS1 601 assigned with (NRP1, P1). At 442/452, a second event may be associated with a VM joining a host, such as VM0 130 joining host-A 110A (e.g., migration). At 443/453, a third event may be associated with a VM leaving a host, such as VM3 133 and VM5 135 leaving (e.g., powered off or migration) host-A 110A. Further, at 444/454, a fourth event may be associated with an addition or removal of at least one physical network adapter. At 445/455, a fifth event may be associated with a PNIC link provided by physical network adapter(s) going UP or DOWN (e.g., due to software and/or hardware failure, upstream router failure, etc.)

Priority-Based Network Bandwidth Allocation

At 460-470 in FIG. 4, in response to detecting the event indicating that network bandwidth allocation is required for VM(s), management entity 190 may identify the relevant (NRPi, Pi), and obtain information such as parameters (e.g., Ri, Si, Li) configured for (NRPi, Pi), T=amount of network bandwidth reserved for VM traffic and state information specifying the number of VMs (denoted as Ki) sharing NRPi. At 480, based on the relevant (NRPi, Pi) and other information obtained at block 470, management entity 190 may configure one or more priority-based network bandwidth allocation policies. Each policy may include parameters denoted as denoted as (Ri(VM), Si(VM), Li(VM)) for a particular VM.

Further, at 490 in FIG. 4, management entity 190 may instruct host-A 110A to apply or enforce the priority-based network bandwidth allocation policies configured according to blocks 410-480. Any suitable policy enforcement approach may be implemented by host-A 110A, such as in a kernel module that is implemented by hypervisor-A 114A and located along a virtual switch datapath, etc.

Some examples will be described using FIG. 7, which is a schematic diagram illustrating first example configurations 700 of priority-based network bandwidth allocation. Here, Table 7A shows example values for respective parameters (Ri, Si, Li) configured for (NRPi, Pi). Table 7B shows example policy configurations in response to detecting event=VM0 130 connecting to LS1 601 or joining host-A 110A. Table 7C shows example policy configurations in response to detecting event=VM3 133 and VM5 155 leaving host-A 110A.

Referring to table 7A (see 711-713 in FIG. 7), based on T=10 Gbps and (R1=60, S1=100, L1=−1) configured for (NRP1, P1), management entity 190 may calculate corresponding parameters (R1', S1', L1') in Gbps. In particular, R1'=(R1/100)*T=6 Gbps, S1'=S1/(S1+S2+S3)=5.71 Gbps and L1'=L1=−1 indicates no rate limitation.

Referring to table 7B (see 720-723 in FIG. 7), in response to detecting event=VM0 130 connecting to LS1 601 or VM0 130 joining host-A 110A, management entity 190 may determine (K1=3, K2=4, K3=3). Here, K1=3 indicates three VMs (i.e., VM0, VM3, VM4) sharing NRP1, K2=4 indicates four VMs (i.e., VM1, VM5, VM6, VM7) sharing NRP2, and K3=3 indicates three VMs (i.e., VM2, VM8, VM9) sharing NRP3 on host-A 110A. Based on T=10 Gbps and (K1=3, K2=4, K3=3), management entity 190 may configure parameters denoted as (Ri(VM), Si(VM), Li(VM)) for an individual VM associated with (NRPi, Pi), where i=1, . . . , N.

In particular, Ri(VM)=minimum network bandwidth allocation for an individual VM, Si(VM)=relative network bandwidth allocation for the VM, and Li(VM)=maximum network bandwidth allocation for the VM. For (NRP1, P1) with K1=3, R1(VM)=R1'/K1=2 Gbps, S1(VM)=S1'/K1=1.9 Gbps and L1(VM)=unlimited. Similarly, for (NRP2, P2) with K2=4, R2(VM)=R2'/K2=0.75 Gbps, S2(VM)=S2'/K2=0.71 Gbps and L2(VM)=unlimited. For (NRP3, P3) with K3=3, R3(VM)=R3'/K3=0, S3(VM)=S3'/K3=0.48 Gbps and L3(VM)=L3'/K3=0.67 Gbps.

(a) Changes in Ki=Number of VMs Sharing NRPi

In relation to table 7C (see 730-733 in FIG. 7), in response to detecting event=VM3 133 and VM5 135 leaving host-A 110A, management entity 190 may determine that (K1=2, K2=3, K3=3). Since K1 has decreased (i.e., fewer VMs sharing NRP1), management entity 190 may update the policy in Table 7B by increasing R1(VM) and S1(VM) for each remaining VM associated with (NRP1, P1). Similarly, since K2 has also decreased (i.e., fewer VMs sharing NRP2), management entity 190 may increase R2(VM) and S2(VM) for each remaining VM associated with (NRP2, P2). The parameters for (NRP3, P3) remain unchanged.

Further (not shown for simplicity), in response to detecting an event indicating an increase in the number of VMs sharing a particular NRPi, management entity 190 may reduce Ri(VM), Si(VM) and Li(VM) for all Ki VMs sharing the NRPi (i.e., a reduced share for each VM). Using examples of the present disclosure, the priority-based network bandwidth allocation policy for each VM may be updated dynamically as Ki changes.

(c) Changes in Network Bandwidth Capacity

FIG. 8 is a schematic diagram illustrating second example configurations 800 of priority-based network bandwidth allocation. Here, Table 7B (also in FIG. 7) shows example parameters (Ri(VM), Si(VM), Li(VM)) for each VM sharing NRPi based on T=10 Gbps and (K1=3, K2=4, K3=3). Table 8A shows example policy configurations in response to detecting event indicating reduced PNIC capacity (e.g., PNIC removal or PNIC link state transitions from UP to DOWN) compared to Table 7B. Table 8B shows example policy configurations in response to detecting event indicating increased PNIC capacity (e.g., PNIC addition or PNIC link state transitions from DOWN to UP) compared to Table 7B.

In relation to table 8A (see 810-813 in FIG. 8), consider the detection of event associated with reduced PNIC capacity (i.e., T=10 Gbps is reduced to T'=8 Gbps). In response, for each (NRPi, Pi), management entity 190 may update the priority-based network bandwidth allocation policy in Table 7B by reducing Ri(VM), Si(VM) and Li(VM) for all Ki VMs sharing the NRPi. Using (NRP1, P1) as an example, R1(VM)=2 Gbps and S1(VM)=1.9 Gbps in Table 7B are reduced to R1(VM)=1.6 Gbps and S1(VM)=1.52 Gbps in Table 8A. L1(VM)=−1 (i.e., unlimited) remains unchanged.

In relation to table 8B (see 820-823 in FIG. 8), consider the detection of event associated with increased PNIC capacity (i.e., T=10 Gbps is increased to T'=12 Gbps). In response, for each (NRPi, Pi), management entity 190 may update the priority-based network bandwidth allocation policy in Table 7B by increasing Ri(VM), Si(VM) and Li(VM) for all Ki VMs sharing the NRPi. Using (NRP1, P1) as an example, R1(VM)=2 Gbps and S1(VM)=1.9 Gbps in Table 7B are increased to R1(VM)=2.4 Gbps and S1(VM)=2.29 Gbps. L1(VM)=−1 (i.e., unlimited) remains unchanged.

Adaptive Network Resource Pool and Rate Limitation

At 495 in FIG. 4, management entity 190 may monitor state information to update various policy parameters dynamically. Some examples will be explained using FIG. 9, which is a schematic diagram illustrating examples 900 of adaptive network resource pool and adaptive rate limitation. Here, table 9A shows example rules for adaptive network resource pool for high-priority workloads or consumers, and table 9B shows example rules for adaptive rate limitation for low-priority workloads or consumers.

In relation to table 9A, the size of NRP1 may be adjusted dynamically based on state information (e.g., percentage) associated with high-priority consumers. At 910 in FIG. 9, in response to detecting that the percentage of high-priority consumers is between 25-50%, R1 may be set to 60% of T=reserved amount for VM traffic. Note that R1=60 is also used in the example in FIG. 7 (see 711). At 920, in response to detecting that the percentage of high-priority consumers is less than 25% based on the state information, management entity 190 may reduce R1 to 40%. At 930, management entity 190 may increase R1 to 75% in response to detecting that the percentage is above 50%.

In relation to table 9A, the rate limitation for low-priority consumers may be adjusted dynamically based on state information (e.g., percentage) associated with low-priority consumers. At 940 in FIG. 9, in response to detecting that the percentage of low-priority consumers is between 25-50%, the maximum allowed speed for NRP3 may be set to 5 Mbps. At 950, in response to detecting that the percentage of low-priority consumers is less than 25%, management entity 190 may increase the maximum allowed speed to 10 Mbps.

At 960, management entity 190 may decrease the maximum allowed speed to 2 Mbps in response to detecting that the percentage is above 50%.

In practice, rate limitation for low-priority consumers (see 630/660 in FIG. 6) may be implemented at a logical port level. This may involve determining whether a particular logical port (e.g., LP3 173 connected to VM3 133) is associated with a substantially low priority level (e.g., P3). The rate limitation policies may be configured for egress and/or ingress traffic. In practice, rate limiting low-priority consumers helps higher priority consumers getting sufficient bandwidth and are not starved even when there is a high number of low-priority consumers.

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 9, container technologies may be used to run various containers inside respective VMs 130-149. Containers are "OS-less", meaning that they do not include any OS that could weigh 10s of Gigabytes (GB). This makes containers more lightweight, portable, efficient, and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 9. For example, the instructions or program code, when executed by the processor of the computer system, may cause the processor to implement examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-unit.

The invention claimed is:

1. A method for a first computer system to perform priority-based network bandwidth allocation, wherein the method comprises:

detecting, by a software defined network (SDN) management entity in a SDN environment, an event indicating that network bandwidth allocation is required for a virtualized computing instance supported by the first computer system or a second computer system;

identifying, by the SDN management entity and from multiple priority levels, a first priority level that is associated with (a) the virtualized computing instance, (b) a logical network element to which the virtualized computing instance is attached, or (c) a group that includes the virtualized computing instance or the logical network element, wherein the multiple priority levels include the first priority level and at least a second priority level, and wherein identifying the first priority level comprises identifying the first priority level based on configuration information that associates a first network resource pool with one of the following: (a) the virtualized computing instance, (b) the logical network element, or (c) the group, wherein the first network resource pool is one of multiple network resource pools configured for the respective multiple priority levels;

obtaining, with the SDN management entity, network bandwidth capacity information associated with one or more physical network adapters that are capable of forwarding traffic associated with the virtualized computing instance; and based on the first priority level and the network bandwidth capacity information, configuring, with the SDN management entity a priority-based network bandwidth allocation policy that includes one or more parameters that are applicable to the traffic associated with the virtualized computing instance.

2. The method of claim 1, wherein the SDN management entity is a SDN controller.

3. The method of claim 1, wherein configuring the priority-based network bandwidth allocation policy comprises one or more of the following:
(a) obtaining a first reservation value that is associated with the first network resource pool configured for the first priority level, wherein the first reservation value specifies a minimum network bandwidth allocation;
(b) obtaining a first shares value that is associated with the first network resource pool configured for the first priority level, wherein the first shares value specifies a relative network bandwidth allocation; and
(c) obtaining a first limit value that is associated with the first network resource pool configured for the first priority level, wherein the first limit value specifies a maximum network bandwidth allocation.

4. The method of claim 3, wherein configuring the priority-based network bandwidth allocation policy comprises one or more of the following:
(a) based on the first reservation value and the network bandwidth capacity information, configuring a second reservation value that specifies a minimum network bandwidth allocation applicable to the traffic associated with the virtualized computing instance;
(b) based on the first shares value and the network bandwidth capacity information, configuring a second shares value that specifies a relative network bandwidth allocation applicable to the traffic associated with the virtualized computing instance; and
(c) based on the first limit value and the network bandwidth capacity information, configuring a second limit value that specifies a maximum network bandwidth allocation applicable to the traffic associated with the virtualized computing instance.

5. The method of claim 1, wherein configuring the priority-based network bandwidth allocation policy comprises:
determining a number of multiple consumers sharing the first network resource pool, wherein the multiple consumers include the virtualized computing instance; and
configuring the priority-based network bandwidth allocation policy based on the number of multiple consumers.

6. The method of claim 1, wherein detecting the event comprises detecting one of the following:
a first event associated with the virtualized computing instance connecting to a logical switch;
a second event associated with the virtualized computing instance joining the first computer system or the second computer system;
a third event associated with a different virtualized computing instance leaving the first computer system or the second computer system;
a fourth event associated with an addition or removal of at least one physical network adapter; and
a fifth event associated with a link provided by the one or more physical network adapters going up or down.

7. The method of claim 1, wherein the method further comprises one or more of the following:
based on state information associated with high-priority consumers sharing the first network resource pool, performing adaptive network resource pool by updating the size of the first network resource pool; and
based on state information associated with low-priority consumers sharing a further network resource pool, performing adaptive rate limitation by updating a limit value associated with the further network resource pool.

8. A non-transitory computer-readable storage medium that includes a set of instructions which, in response to execution by a processor of a computer system, cause the processor to perform operations comprising:
detecting, by a software defined network (SDN) management entity in a SDN environment, an event indicating that network bandwidth allocation is required for a virtualized computing instance supported by the first computer system or a second computer system;
identifying, by the SDN management entity and from multiple priority levels, a first priority level that is associated with (a) the virtualized computing instance, (b) a logical network element to which the virtualized computing instance is attached, or (c) a group that includes the virtualized computing instance or the logical network element, wherein the multiple priority levels include the first priority level and at least a second priority level, and wherein identifying the first priority level comprises identifying the first priority level based on configuration information that associates a first network resource pool with one of the following: (a) the virtualized computing instance, (b) the logical network element, or (c) the group, wherein the first network resource pool is one of multiple network resource pools configured for the respective multiple priority levels;
obtaining, by the SDN management entity, network bandwidth capacity information associated with one or more physical network adapters that are capable of forwarding traffic associated with the virtualized computing instance; and
based on the first priority level and the network bandwidth capacity information, configuring, by the SDN management entity, a priority-based network bandwidth allocation policy that includes one or more parameters that are applicable to the traffic associated with the virtualized computing instance.

9. The non-transitory computer-readable storage medium of claim 8, wherein the SDN management entity is a SDN controller.

10. The non-transitory computer-readable storage medium of claim 8, wherein configuring the priority-based network bandwidth allocation policy comprises one or more of the following:
(a) obtaining a first reservation value that is associated with the first network resource pool configured for the first priority level, wherein the first reservation value specifies a minimum network bandwidth allocation;
(b) obtaining a first shares value that is associated with the first network resource pool configured for the first priority level, wherein the first shares value specifies a relative network bandwidth allocation; and
(c) obtaining a first limit value that is associated with the first network resource pool configured for the first priority level, wherein the first limit value specifies a maximum network bandwidth allocation.

11. The non-transitory computer-readable storage medium of claim 10, wherein configuring the priority-based network bandwidth allocation policy comprises one or more of the following:

(a) based on the first reservation value and the network bandwidth capacity information, configuring a second reservation value that specifies a minimum network bandwidth allocation applicable to the traffic associated with the virtualized computing instance;
(b) based on the first shares value and the network bandwidth capacity information, configuring a second shares value that specifies a relative network bandwidth allocation applicable to the traffic associated with the virtualized computing instance; and
(c) based on the first limit value and the network bandwidth capacity information, configuring a second limit value that specifies a maximum network bandwidth allocation applicable to the traffic associated with the virtualized computing instance.

12. The non-transitory computer-readable storage medium of claim 8, wherein configuring the priority-based network bandwidth allocation policy comprises:
determining a number of multiple consumers sharing the first network resource pool, wherein the multiple consumers include the virtualized computing instance; and
configuring the priority-based network bandwidth allocation policy based on the number of multiple consumers.

13. The non-transitory computer-readable storage medium of claim 8, wherein detecting the event comprises detecting one of the following:
a first event associated with the virtualized computing instance connecting to a logical switch;
a second event associated with the virtualized computing instance joining the first computer system or the second computer system;
a third event associated with a different virtualized computing instance leaving the first computer system or the second computer system;
a fourth event associated with an addition or removal of at least one physical network adapter; and
a fifth event associated with a link provided by the one or more physical network adapters going up or down.

14. The non-transitory computer-readable storage medium of claim 8, the operations further comprising one or more of the following:
based on state information associated with high-priority consumers sharing the first network resource pool, performing adaptive network resource pool by updating the size of the first network resource pool; and
based on state information associated with low-priority consumers sharing a further network resource pool, performing adaptive rate limitation by updating a limit value associated with the further network resource pool.

15. A computer system, being a first computer system, comprising:
a processor; and
non-transitory computer-readable storage medium that includes a set of instructions which, in response to execution by the processor, cause the first computer system to perform operations comprising:
detecting by a software defined network (SDN) management entity in a SDN environment, an event indicating that network bandwidth allocation is required for a virtualized computing instance supported by the first computer system or a second computer system;
identifying by the SDN management entity and from multiple priority levels, a first priority level that is associated with (a) the virtualized computing instance, (b) a logical network element to which the virtualized computing instance is attached, or (c) a group that includes the virtualized computing instance or the logical network element, wherein the multiple priority levels include the first priority level and at least a second priority level, and wherein identifying the first priority level comprises identifying the first priority level based on configuration information that associates a first network resource pool with one of the following: (a) the virtualized computing instance, (b) the logical network element, or (c) the group, wherein the first network resource pool is one of multiple network resource pools configured for the respective multiple priority levels;
obtaining, by the SDN management entity, network bandwidth capacity information associated with one or more physical network adapters that are capable of forwarding traffic associated with the virtualized computing instance; and
based on the first priority level and the network bandwidth capacity information, configuring, by the SDN management entity, a priority-based network bandwidth allocation policy that includes one or more parameters that are applicable to the traffic associated with the virtualized computing instance.

16. The computer system of claim 15, wherein the SDN management entity is a SDN controller.

17. The computer system of claim 15 wherein configuring the priority-based network bandwidth allocation policy comprises one or more of the following:
(a) obtaining a first reservation value that is associated with the first network resource pool configured for the first priority level, wherein the first reservation value specifies a minimum network bandwidth allocation;
(b) obtaining a first shares value that is associated with the first network resource pool configured for the first priority level, wherein the first shares value specifies a relative network bandwidth allocation; and
(c) obtaining a first limit value that is associated with the first network resource pool configured for the first priority level, wherein the first limit value specifies a maximum network bandwidth allocation.

18. The computer system of claim 17, wherein configuring the priority-based network bandwidth allocation policy comprises one or more of the following:
(a) based on the first reservation value and the network bandwidth capacity information, configuring a second reservation value that specifies a minimum network bandwidth allocation applicable to the traffic associated with the virtualized computing instance;
(b) based on the first shares value and the network bandwidth capacity information, configuring a second shares value that specifies a relative network bandwidth allocation applicable to the traffic associated with the virtualized computing instance; and
(c) based on the first limit value and the network bandwidth capacity information, configuring a second limit value that specifies a maximum network bandwidth allocation applicable to the traffic associated with the virtualized computing instance.

19. The computer system of claim 15, wherein configuring the priority-based network bandwidth allocation policy comprises one or more of the following:
determining a number of multiple consumers sharing the first network resource pool, wherein the multiple consumers include the virtualized computing instance; and
configuring the priority-based network bandwidth allocation policy based on the number of multiple consumers.

20. The computer system of claim 15, wherein detecting the event comprises detecting one of the following:
- a first event associated with the virtualized computing instance connecting to a logical switch;
- a second event associated with the virtualized computing instance joining the first computer system or the second computer system;
- a third event associated with a different virtualized computing instance leaving the first computer system or the second computer system;
- a fourth event associated with an addition or removal of at least one physical network adapter; and
- a fifth event associated with a link provided by the one or more physical network adapters going up or down.

21. The computer system of claim 15, the operations further comprising one or more of the following:
- based on state information associated with high-priority consumers sharing the first network resource pool, perform adaptive network resource pool by updating the size of the first network resource pool; and
- based on state information associated with low-priority consumers sharing a further network resource pool, perform adaptive rate limitation by updating a limit value associated with the further network resource pool.

\* \* \* \* \*